(12) United States Patent
Guillemaud

(10) Patent No.: US 6,201,254 B1
(45) Date of Patent: Mar. 13, 2001

(54) SYSTEM FOR DETERMINING AND QUANTIFYING THE ALIGNMENT OF AN OBJECT WITH A COUPLING EYEPIECE AND A RECORDING APPARATUS

(75) Inventor: Régis Guillemaud, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/261,225

(22) Filed: Mar. 3, 1999

(30) Foreign Application Priority Data

Mar. 16, 1998 (FR) .................................................. 98 03184

(51) Int. Cl.[7] ........................... G01N 21/86; G01B 11/00; G03B 13/00; G02B 21/06; G02B 27/02
(52) U.S. Cl. .................. 250/559.3; 250/548; 250/201.1; 250/201.4; 250/201.8; 356/399; 356/400; 356/401; 396/104; 396/120; 359/389; 359/390; 359/800
(58) Field of Search .............................. 250/559.3, 548, 250/201.4, 201.5–201.9, 201.1; 356/399, 400, 401; 396/104, 120; 359/389, 390, 800

(56) References Cited

U.S. PATENT DOCUMENTS

| | | | |
|---|---|---|---|
| 1,854,665 | * 4/1932 | Parker | 353/101 |
| 4,201,456 | 5/1980 | Wolbarsht | 353/101 |
| 4,500,189 | 2/1985 | Aoki | 396/104 |
| 4,575,626 | 3/1986 | Oinoue et al. | 250/201.8 |
| 4,754,334 | * 6/1988 | Kriz et al. | 396/429 |
| 5,075,561 | * 12/1991 | Rioux | 250/559.38 |
| 5,168,327 | * 12/1992 | Yamawaki | 356/376 |
| 5,488,230 | * 1/1996 | Mizutani et al. | 250/546 |
| 5,519,202 | * 5/1996 | Kusaka | 250/201.8 |
| 5,563,413 | * 10/1996 | Coda et al. | 250/332 |
| 5,973,771 | * 10/1999 | Hibbs et al. | 356/121 |

* cited by examiner

Primary Examiner—Georgia Epps
Assistant Examiner—Evelyn A. Lester
(74) Attorney, Agent, or Firm—Oblon, Spivak, McClelland, Maier & Neustadt, P.C.

(57) ABSTRACT

The present invention relates to a system for determining the alignment of an object, whose image is to be recorded, with a coupling eyepiece and an image capture apparatus that defines an image plane (Pi), comprising:

an image capture apparatus (2) equipped with the ability for adjusting its own position;

a light source (1) that emits at least two non-focused luminous dots (1a, 1b);

eyepiece coupling lens(es) or element(s) (3) that focus on an object plane (Po);

an opaque mask (4) that is perforated with at least two holes (5a, 5b) and that is positioned in front of light source (1) such that it transmits at least part of the light emitted by the light source; and calculating mechanism for determining whether alignment exists and, in the case of non-alignment, for quantifying the non-alignment.

6 Claims, 2 Drawing Sheets

SYSTEM FOR DETERMINING AND QUANTIFYING THE ALIGNMENT OF AN OBJECT WITH A COUPLING EYEPIECE AND A RECORDING APPARATUS

DESCRIPTION

1. Field of the Invention

The present invention relates to a system for determining whether an object whose image is to be recorded, is aligned with a coupling eyepiece and an image capture apparatus and, in the case of non-alignment, for quantifying the position setting that is required on the components of the system in order to achieve said alignment.

The invention may have applications in any sectors concerned with the creation of optimal quality images of an object on an image plane through an eyepiece, particularly in the medical sector.

2. Background Art

In the field of image capture, specialists in the field attempt to achieve images of the highest quality possible, in other words with satisfactory focussing of the capture system and the best possible image definition.

In order to obtain an image of excellent quality, the image plane, i.e. the plane in which the image capture apparatus lies, must be perfectly aligned with the coupling eyepiece on the one hand and with the object on the other. However, the alignment is difficult to effect as the orthogonality of the image plane must be adjusted according to the optical axis and to the focal distance.

Also, in order to create images of an object on an image plane through an eyepiece, it is necessary to obtain optimal positioning between the object, the eyepiece and the image plane. The optimal positioning can be achieved by means of settings that are usually made between the positions of the eyepiece and the capture system (i.e. the image plane). The object is generally positioned so that it is fixed. There are two kinds of settings:

- a setting, by means of rotation, of the perpendicularity of the image plane in relation to the optical axis of the eyepiece; and
- a setting of the image plane position, i.e. the capture apparatus, in relation to the eyepiece; this is the standard type of focus setting used in an ordinary camera. The setting is made by means of a translation movement along the optical axis, and enables the image plane, i.e. the plane of the image recording apparatus or the capture system, to be focused on the object plane, i.e. the plane in which the object to be recorded lies.

Generally, the object is at a variable distance from the eyepiece. The eyepiece/image plane setting can therefore be made either approximately or visually by the operator using range finding or reflex means.

Some image recording apparatuses are even equipped with a system for measuring the object/eyepiece distance that measures the distance between the object and the eyepiece using an ultrasound or infrared method. In this technique the eyepiece/image plane setting is made automatically.

However, in these standard apparatuses, the depth of field at the eyepiece is significant. The eyepiece/image plane setting is therefore not always accurate.

Moreover, applications exist in which the eyepiece/image plane setting is finer, for example in electron microscopy. In electron microscopy the operator can adjust the eyepiece/image plane setting visually. The operator can also make the setting using a technique known as the "wobber focusing aid". The technique is described on pages 29 to 31 of "The Principles and Practice of Electron Microscopy" by Ian M. Watt (Cambridge University Press). This technique consists in oscillating a luminous beam between two positions in relation to the lens of the image recording apparatus. This produces a double response of the object observed on the image plane until the system reaches optimal focusing.

However, these "wobbling" methods are difficult to implement as it is not easy to deflect the light source.

In astronomy, it is also useful to have fine setting, particularly when a CCD camera is used in combination with an astronomic eyepiece as described in the article "Une Mission Haute Résolution au T 60" (A High Definition Assignment at T 60) by J. Dijon et al., published in Pulsar magazine No. 707, March–April 1995. The article describes a method that enables a relatively sensitive eyepiece/image plane setting to be achieved. The method consists in selecting a single star, positioning a two-holed mask at the entry of the astronomic eyepiece and verifying the number of patches of light that appear on the CCD image recording apparatus. If the CCD camera is not correctly focused in relation to the eyepiece, two patches appear on the camera. If, however, the focusing is correct only a single patch appears on the CCD camera. By displacing the projection of the star over different areas of the CCD camera, the alignment of the eyepiece/CCD camera can be adjusted, in other words it is possible to adjust the alignment between the eyepiece and the image plane.

However, this method can only be used for an object located at infinity, as is the case in astronomy.

Other optical methods enable the orthogonality of the image plane with the optical axis to be adjusted. One method consists in using an autocollimation eyepiece that is placed on the entry of the eyepiece. In this example, the image plane must provide a reflection for this kind of setting. Moreover, difficulties may arise when other reflective planes are present on the trajectory between the eyepiece and the image plane, as is the case in a CCD camera being used through a glass window.

A method of this kind therefore proves difficult to put into operation. Also, this method only provides the setting required for surface evenness, it does not provide the setting for focusing required to align the system.

DISCLOSURE OF THE INVENTION

The aim of the invention is to overcome the drawbacks of the techniques described above. In order to do this, the invention provides a system for determining whether an object is aligned or non-aligned with the coupling eyepiece and the image capture apparatus and, in the case of non-alignment, for quantifying the settings that are required on the system in order to achieve alignments of said elements.

In order to achieve this, the system of the invention uses an image capture apparatus and a light source to create a group of luminous dots and an opaque mask perforated with at least two holes through which the light passes, the images of said luminous dots on the image plane being split into two if the system is not correctly aligned. Analysis of the said split images is used to quantify the setting of the system that is required to achieve alignment.

More precisely, the invention relates to a system for determining the alignment of an object, whose image is to be recorded, with a coupling eyepiece and an image capture apparatus that defines an image plane. The system is characterized in that it comprises:

- an image capture apparatus equipped with setting means for its own positioning;

a light source that is movable in the object plane and that emits at least two non-focused luminous dots; the source produces:

a luminous dot if the evenness of the detector has no significant influence on the quality of the alignment; or at least three luminous dots under normal conditions; moreover, the three dots can be produced by:

a source that creates three luminous dots simultaneously;

the displacement of a dot-type light source in three places;

eyepiece coupling means focusing on an object plane and ensuring the coupling of an image in the image plane with an image created in the object plane;

a removable opaque mask perforated with at least two holes and placed in front of the light source so as to transmit at least part of the light that is emitted by said light source, the light transmitted through each hole in the mask creating at least one image of a luminous dot on the capture apparatus, said image being split into two if the elements are non-aligned; and means for determining whether alignment exists and, if there is no alignment, for quantifying said non-alignment.

The means for determining whether alignment exists are, for example:

means for displaying the image (for example a screen); or computing means in order to evaluate the extent of the split, i.e. the distance separating the two patches produced by a single luminous dot.

In one embodiment of the invention, the mask is placed in the focal plane of the eyepiece coupling means.

Advantageously, the holes in the mask are small so that the size of the image of each luminous dot on the image plane is of the same order of magnitude as the resolution of the system on the object plane, i.e. between two and three times the value of the resolution.

In one embodiment of the invention the system comprises an object support that is transparent to beams of light and that defines the object plane.

In another embodiment of the invention the object plane is virtual.

The system of the invention may also comprise one or more mirrors that are positioned between the object plane and the capture apparatus.

DESCRIPTION OF EMBODIMENTS OF THE INVENTION

The present invention relates to a system for determining the alignment or non-alignment of an object whose image is to be recorded, with a coupling eyepiece and an image capture apparatus that defines the image plane of the system.

Throughout the description that follows, reference will be made to the "image plane" and the "object plane":

the image plane is the plane in which the image of the object is formed in the image recording apparatus (or the image capture apparatus);

the object plane is the plane in which the object lies at the time the shot is taken. It should be noted, however, that the method of aligning these planes is implemented without the object being present; no object is required to determine whether the system is aligned or non-aligned, only the object plane i.e. the plane in which the object will lie when the shot is taken, is used to implement the method of the invention. During alignment the object plane is defined either virtually or materially by the support on which the object will later be placed when the image is recorded.

Throughout the setting up of the alignment method, and during the shot itself, the coupling eyepiece (more simply called "the eyepiece") focuses on said object plane.

The aim of the system of the invention is to produce a split on the image plane of the image of a luminous dot that is placed in the object plane when the alignment between the object, the coupling eyepiece and the image plane is not achieved, in other words when the system is badly adjusted.

Figure 1:
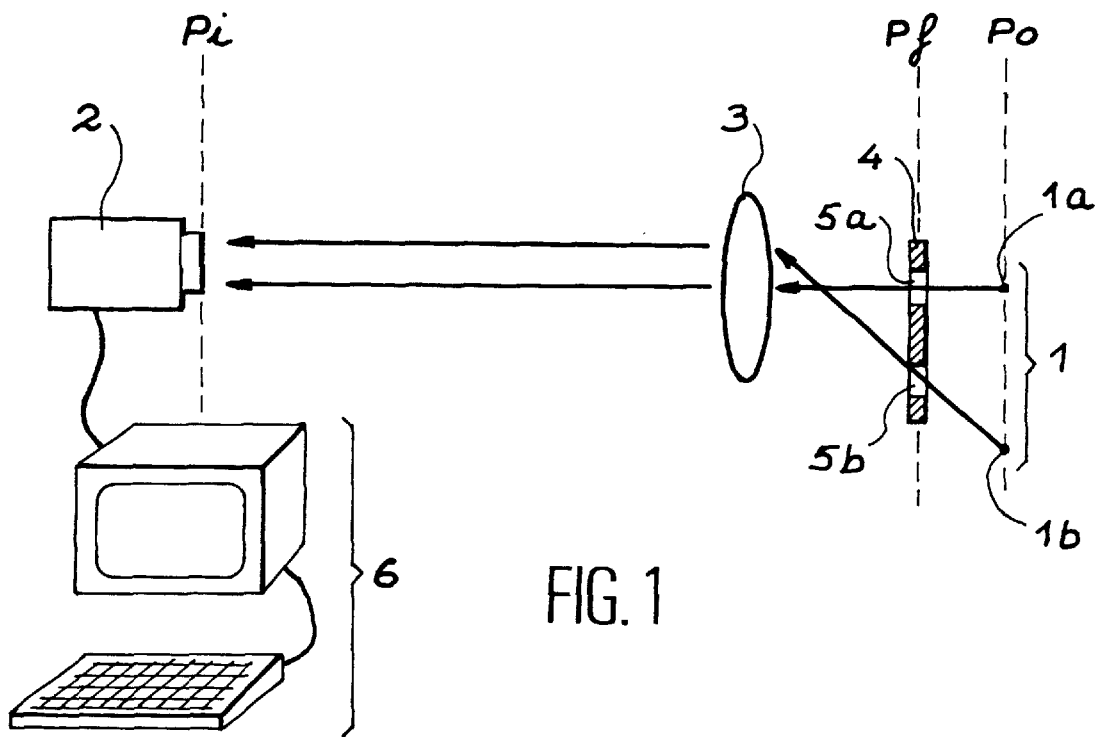
FIG. 1 is a diagram of the system of the invention.

In order to achieve this, the system of the invention shown in FIG. 1 comprises a light source 1 that emits a luminous dot 1a. Said light source is positioned in the object plane (referred to as Po) of the optical system in the spot where the object will be positioned when the shot is taken.

If the object plane is materialized by an object support, said object support must be transparent to beams that are emitted by the light source. If, for example, the beams that are emitted are X rays, the object support that constitutes the object plane must be made of Plexiglas®.

The system of the invention also comprises an image capture apparatus 2 that is equipped with means for adjusting its own position. These means for adjusting its position can be standard mechanical means such as an assembly consisting of three thumbwheels; said thumbwheels are not shown in the figure in order to simplify the diagram.

The capture apparatus can be, for example, a "CCD detector".

It should be noted that focusing on the object plane depends on the position of the CCD detector relative to the coupling eyepiece that is located between the object plane and the image plane.

The system of the invention also comprises a coupling eyepiece 3 that is placed between the object plane Pa and the image plane Pi. The coupling eyepiece, more simply called the "lens", enables an image created in the object plane to be coupled with the image that is obtained in the image plane.

Furthermore, the system of the invention comprises a mask 4 that is opaque to beams emitted by the light source and that is advantageously placed near the focal plane Pf of the system or near the eyepiece 3. Said mask is perforated with at least two holes 5a and 5b that allow light emitted by light source 1 to be at least partially transmitted. In particular, each hole in the mask corresponds to a different direction of the incident beam, which enables the image of the luminous dots on image plane Pi to be split should the elements be badly aligned.

Advantageously, the luminous dots from the light source are small such that their diameter is of the same order of magnitude as the resolution of the object plane of the system; they are, for example, equal to between two and three times the resolution of the system. Furthermore, the light emitted by the luminous dots must not be focused.

The mask is also intended to limit the quantity of light on the CCD detector such that the size of the luminous dots is reduced thereby defining the geometric position of said luminous dots more accurately.

According to the invention, said mask is removable; the mask is only used during the alignment stage.

The system of the invention also comprises computing means 6 that enable non-alignment to be quantified, i.e.

quantify the settings that need to be carried out on the system in order to achieve alignment. Said computing means can be standard computing means such as a PC.

In one embodiment of the invention, one or more mirrors can be included in the optical path between the object plane and the image plane. It is therefore possible to use a non-linear optical path in certain applications.

Figure 2:
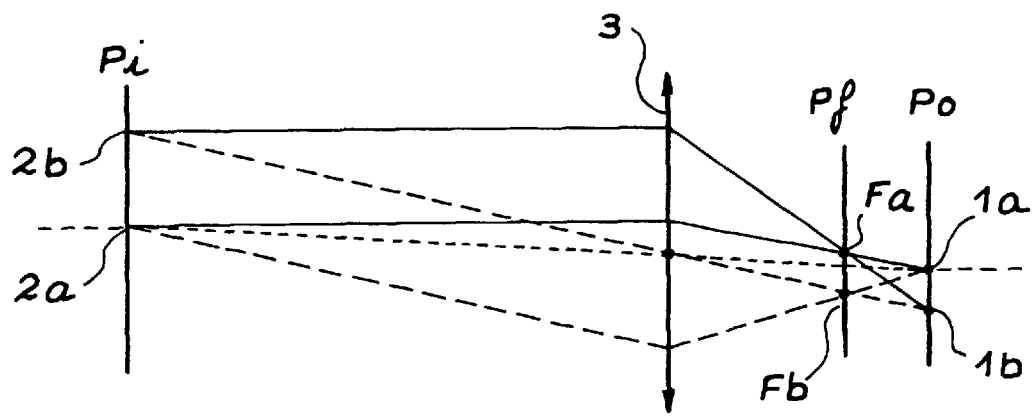
FIG. 2 is a diagram showing the optical path of the beams of light emitted from the light source to the image plane.

FIG. 2 is a diagram showing the optical path of luminous dots 1a and 1b that are emitted by the light source. Said luminous dots 1a and 1b that are emitted by the light source are projected as 2a and 2b on the image plane Pi, i.e. on the image capture apparatus, after an optical path that passes through coupling eyepiece 3.

In FIG. 2 the image capture apparatus 2 is aligned with light source 1 and eyepiece 3 because all the light beams emitted by each dot of the object plane 1a and 1b converge towards a single point on the image plane, respectively 2a and 2b. Furthermore, the diagram shows that the incident beams of light that are parallel to the optical axis of the lens (shown as undotted lines) all pass through focal point Fa. It should also be noted that the incident beams, that are oblique and parallel to one another (shown as dotted lines in FIG. 2), pass through another single focal point Fb. Each focal point Fa and Fb of focal plane Pf therefore corresponds to a direction of incident beams.

It may also be noted that mask 4 is advantageously placed in focal plane Pf or near to it and only lets light pass through holes 5a and 5b that correspond to focal points Fa and Fb.

The luminous beams that are produced from luminous dot 1a will now be considered, said luminous dot passing through holes 5a and 5b of the mask at focal points Fa and Fb. If the CCD detector 2 is correctly positioned relative to eyepiece 3 and to object plane Po, i.e. providing the said three elements are aligned, the image of luminous dot 1a is then point 2a.

However, if the CCD detector is unfocused the image of luminous dot 1a then consists of two dots on the CCD detector. In this case the distance between the two image points of luminous dot 1a is in proportion to the focal distance of the CCD detector. Mask 4 is therefore used to select the evenness and focus setting of the system. This enables the images of the double luminous dots to be brought as closely together as possible on the image plane Pi, defined by the CCD detector, and for all the luminous dots that are emitted by the light source.

Once the spacing between two images of a luminous dot for two different positions of the CCD detector is known, it is possible to find the optimal focus position, i.e. the optimal position of the CCD detector in order for the two images of the luminous dot to become a single dot. Said position setting on the system is either determined by the computing means or by displaying the image created on the detector and by visually determining the extent of the split.

In one embodiment of the invention, light source 1 is an optical sight constituted by a matrix of luminous dots such as light emitting diodes (LEDs) that are positioned on a support.

Figure 3:
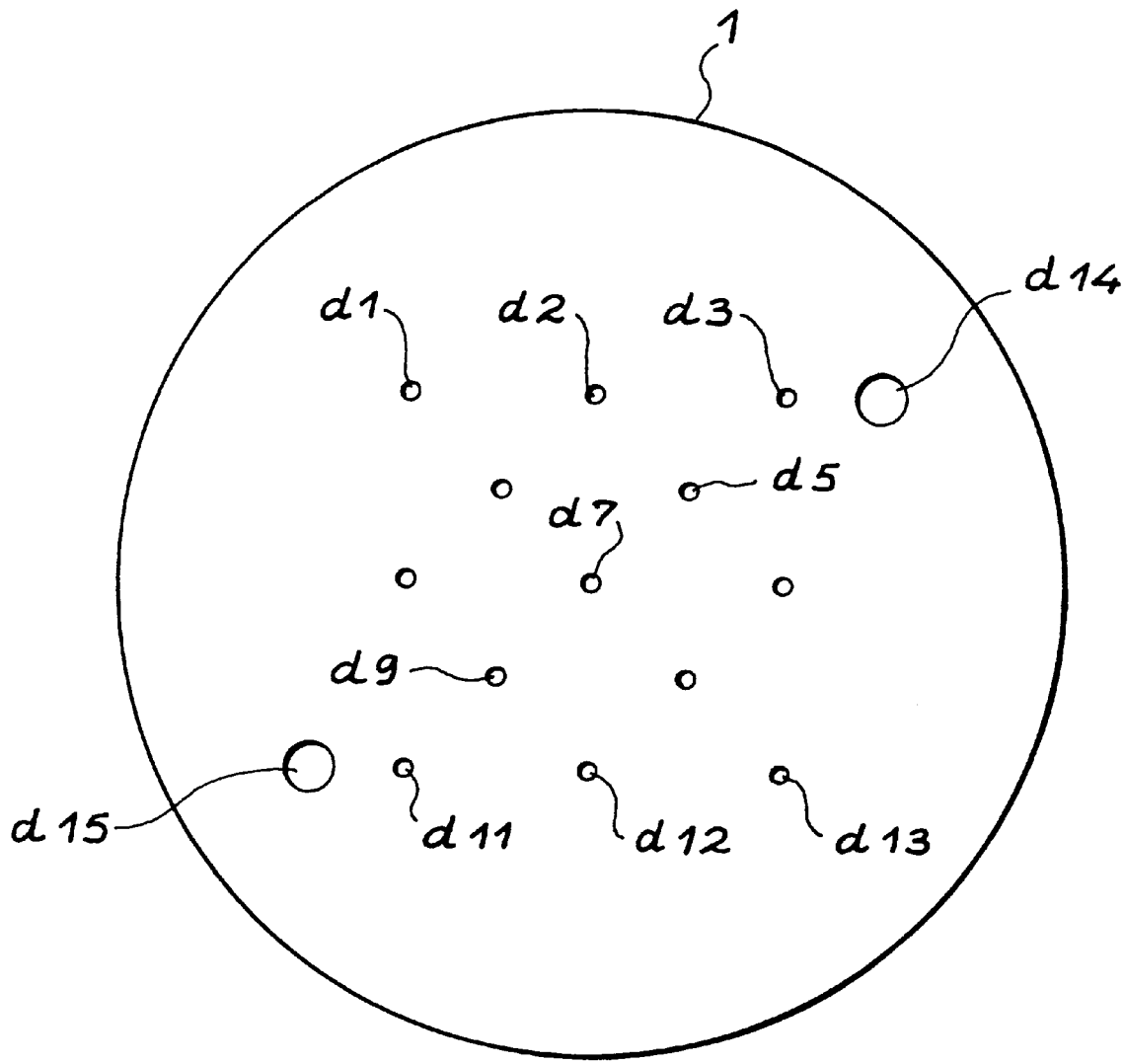
FIG. 3 shows an example of a light source.

FIG. 3 shows an optical sight that consists of a matrix of diodes that are positioned on a disc-shaped support. In the example, the diameter of most of the diodes (or LEDs) is 0.3 mm. Said diameter enables an image of luminous dots of approximately 3 pixels to be displayed on the CCD detector; the diameter of two of the diodes is larger and this is used to define the orientation of the optical sight. In particular, the optical sight shown in FIG. 3 comprises thirteen calibration LEDs d1 to d13 with a diameter of 0.3 mm and two positioning LEDs d14 and d15 with a diameter of approximately 2 mm.

In an automatically calculated application where the relative positions of the all the LEDs are known, the two positioning LEDs are used to quickly determine the orientation of all the points of the optical sight.

What is claimed is:

1. System for determining the alignment of an object, whose image is to be recorded, with a coupling eyepiece and an image capture apparatus that defines an image plane (Pi), characterized in that it comprises:

an image capture apparatus (2) equipped with means for adjusting its own position;

coupling eyepiece means (3) that focus on an object plane (Po) and that ensure the coupling of an image in the image plane with an image created in the object plane;

a light source (1) that is movable in the object plane and that emits at least two non-focused luminous dots (1a, 1b);

a removable opaque mask (4) that is perforated with at least two holes (5a, 5b) and that is positioned in front of light source (1) such that it transmits at least part of the light emitted by said light source, the light transmitted through each hole in the mask forming at least one image (2a, 2b) of a luminous dot on the capture apparatus, said at least one image being split into two if the elements are non-aligned, and means for determining whether alignment exists and, in the case of non-alignment, for quantifying said non-alignment.

2. System of claim 1, characterized in that the luminous dots are small, such that the size of the at least one image of each luminous dot on the image plane is of the same order of magnitude as the resolution of the system on the object plane.

3. System of claim 1, characterized in that the system comprises an object support that is transparent to beams of light and that defines the object plane.

4. System of claim 1, characterized in that the object plane is virtual.

5. System of claim 1, characterized in that the system comprises at least one mirror that is positioned between the object plane and the capture apparatus.

6. System of claim 1, characterized in that the opaque mask is positioned in the focal plane of the eyepiece coupling means.

* * * * *